United States Patent
Dasgupta et al.

(10) Patent No.: US 10,484,405 B2
(45) Date of Patent: Nov. 19, 2019

(54) PACKET CAPTURE FOR ANOMALOUS TRAFFIC FLOWS

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 14/603,978

(22) Filed: Jan. 23, 2015

(65) Prior Publication Data
US 2016/0219065 A1    Jul. 28, 2016

(51) Int. Cl.
    *H04L 29/06*    (2006.01)

(52) U.S. Cl.
CPC ...... *H04L 63/1425* (2013.01); *H04L 63/1441* (2013.01); *H04L 63/1458* (2013.01)

(58) Field of Classification Search
CPC . H04L 63/1416; H04L 63/145; H04L 12/585; H04L 51/12; H04L 63/1408; H04L 63/1441; H04L 2463/144; H04L 43/022; H04L 63/0227; H04L 63/14; H04L 41/0631
See application file for complete search history.

(56) References Cited

U.S. PATENT DOCUMENTS

| | | | | |
|---|---|---|---|---|
| 8,898,788 | B1* | 11/2014 | Aziz | G06F 21/00 726/23 |
| 9,571,523 | B2* | 2/2017 | Porras | H04L 63/20 |
| 2010/0082513 | A1 | 4/2010 | Liu | |
| 2010/0154057 | A1* | 6/2010 | Ko | H04L 63/1416 726/23 |
| 2011/0231510 | A1* | 9/2011 | Korsunsky | G06F 21/55 709/213 |
| 2011/0314542 | A1* | 12/2011 | Viswanathan | G06F 21/554 726/23 |
| 2012/0216282 | A1 | 8/2012 | Pappu et al. | |
| 2012/0240185 | A1* | 9/2012 | Kapoor | H04L 63/1425 726/1 |
| 2012/0254210 | A1* | 10/2012 | Dhulipala | G06F 17/30985 707/758 |

(Continued)

FOREIGN PATENT DOCUMENTS

EP    2785008 A1    10/2014

OTHER PUBLICATIONS

International Search Report and Written Opinion dated Mar. 23, 2016 in connection with PCT/US2016/013133.

(Continued)

*Primary Examiner* — Mohammad A Siddiqi
(74) *Attorney, Agent, or Firm* — Behmke Innovation Group LLC; James Behmke; Stephen D. LeBarron

(57) ABSTRACT

In one embodiment, a first device in a network identifies an anomalous traffic flow in the network. The first device reports the anomalous traffic flow to a supervisory device in the network. The first device determines a quarantine policy for the anomalous traffic flow. The first device determines an action policy for the anomalous traffic flow. The first device applies the quarantine and action policies to one or more packets of the anomalous traffic flow.

20 Claims, 15 Drawing Sheets

(56) References Cited

U.S. PATENT DOCUMENTS

2012/0311664 A1* 12/2012 Elrod .................. H04L 63/1416
726/1
2015/0341376 A1* 11/2015 Nandy ................ H04L 63/1408
726/23
2015/0341379 A1* 11/2015 Lefebvre ............. H04L 43/0894
726/22

OTHER PUBLICATIONS

Sajassi et al., "BGP MPLS Based Ethernet VPN", Network Working Group Internet-Draft, <draft-ietf-l2vpn-evpn-11>, Oct. 18, 2014, 52 pages, Internet Engineering Task Force Trust.

* cited by examiner

PACKET CAPTURE FOR ANOMALOUS TRAFFIC FLOWS

TECHNICAL FIELD

The present disclosure relates generally to computer networks, and, more particularly, to capturing packets of an anomalous traffic flow for further analysis.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
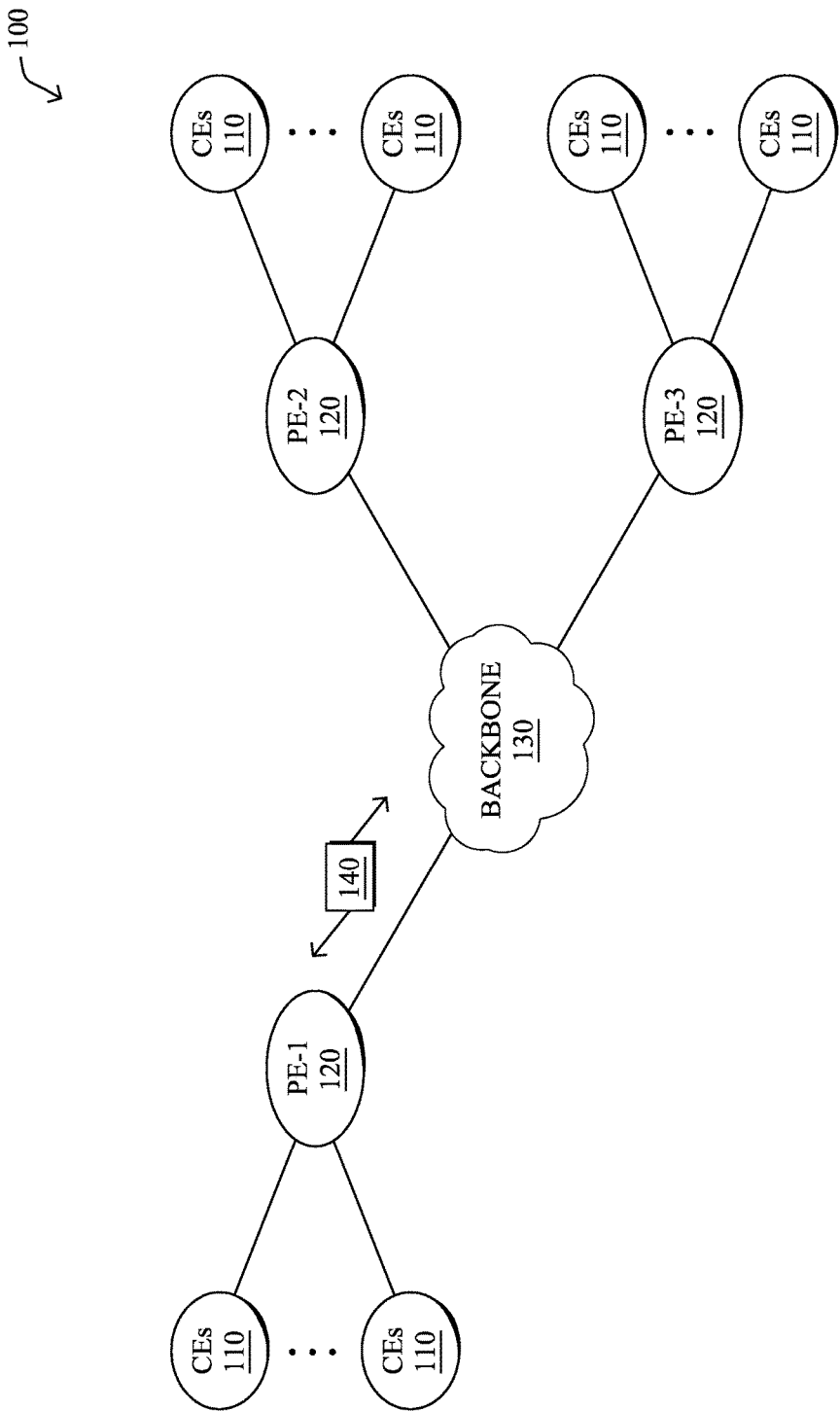
FIGS. 1A-1B illustrate an example communication network.

According to one or more embodiments of the disclosure, a first device in a network identifies an anomalous traffic flow in the network. The first device reports the anomalous traffic flow to a supervisory device in the network. The first device determines a quarantine policy for the anomalous traffic flow. The first device determines an action policy for the anomalous traffic flow. The first device applies the quarantine and action policies to one or more packets of the anomalous traffic flow.

In further embodiments, a device in a network receives an indication of an anomalous traffic flow detected by a node in the network. The device determines an action policy for the anomalous traffic flow, based on an anomaly type or severity associated with the anomalous traffic flow. The device determines a quarantine policy for the anomalous traffic flow, based on the anomaly type or severity associated with the anomalous traffic flow. The device provides the action and quarantine policies to the node.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement (SLA) characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
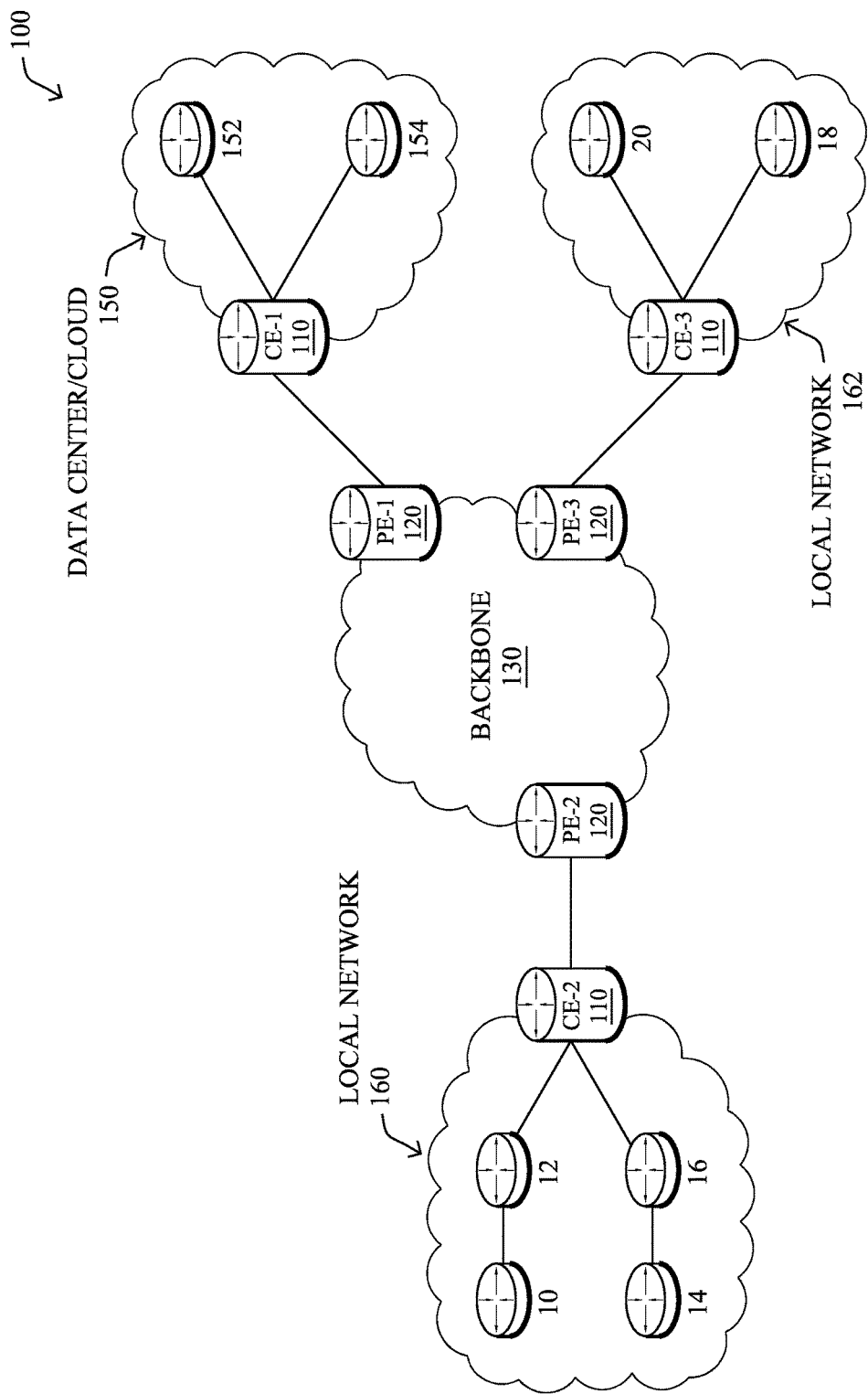

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), etc. As would be appreciated, network 100 may include any number of local networks, data centers, cloud environments, devices/nodes, servers, etc.

In some embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
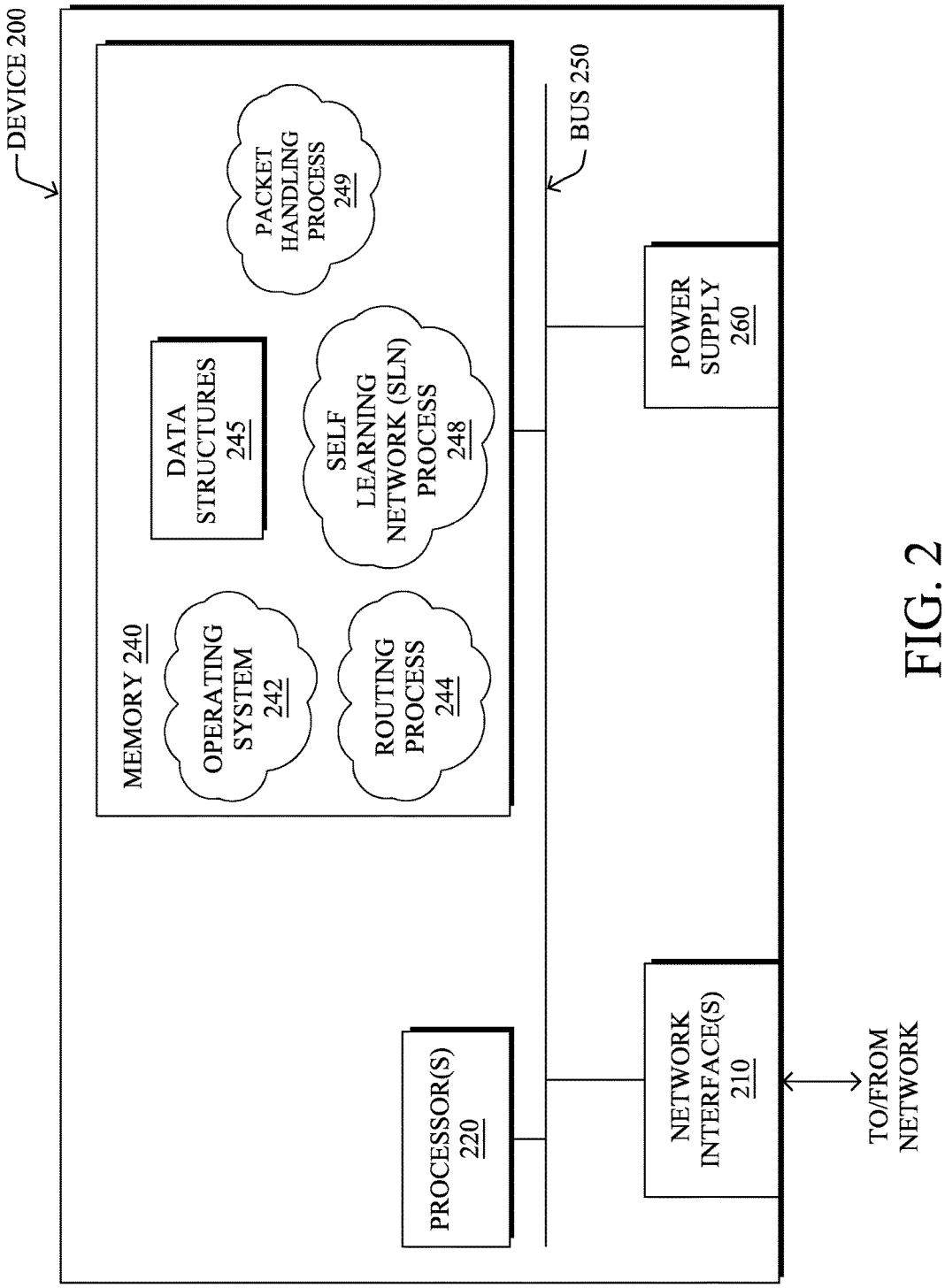
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), or any other computing device that supports the operations of network 100 (e.g., switches, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248 and/or a packet handling process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points).

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

As noted above, learning machine techniques may be used in a self-learning network (SLN) for purposes of anomaly detection. Typically, however, anomaly mitigation in a network is performed in a binary manner, i.e., a predefined mitigation action is performed automatically whenever an anomaly is detected. Thus, anomaly detection systems typically do not support an inspection mechanism that allows further inspection of the anomalous traffic at the packet level and in real time (e.g., by a human operator, etc.). Such systems also do not support dynamic mechanisms that prevent the spread of potentially malicious behavior during the investigation period, such as dynamically tagging and quarantining the anomalous traffic, temporarily.

Packet Capture for Anomalous Traffic Flows

The techniques herein provide mechanisms to dynamically represent and quarantine newly identified anomalous traffic. In one aspect, a tracking mechanism is disclosed that enables a network device to identify traffic of interest that matches packet tracking criteria. In another aspect, an action/mitigation mechanism is disclosed that allows the device to dynamically apply any number of different network actions to packets of the traffic. In a further aspect, quarantine mechanisms are disclosed that provide multiple ways of quarantining or capturing packets of the traffic for further analysis. In yet another aspect, mechanisms are disclosed herein that allows the packets of the traffic to be presented (e.g., to a user interface) for further analysis.

Specifically, according to one or more embodiments of the disclosure as described in detail below, a first device in a network identifies an anomalous traffic flow in the network. The first device reports the anomalous traffic flow to a supervisory device in the network. The first device determines a quarantine policy for the anomalous traffic flow. The first device determines an action policy for the anomalous traffic flow. The first device applies the quarantine and action policies to one or more packets of the anomalous traffic flow.

Illustratively, the techniques described herein may be performed by hardware, software, and/or firmware, such as in accordance with the packet handling process 249, which may include computer executable instructions executed by the processor 220 (or independent processor of interfaces 210) to perform functions relating to the techniques described herein, e.g., in conjunction with routing process 244 (and/or SLN process 248).

Operationally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory learning agent (SLA). In general, a DLA may be operable to monitor network conditions (e.g., router states, traffic flows, etc.), perform anomaly detection on the monitored data using one or more machine learning models, report detected anomalies to the SLA, and/or perform local mitigation actions. Similarly, an SLA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

An example of an SLN infrastructure detecting an anomalous traffic flow is shown in FIGS. 3A-3D, according to various embodiments. As shown, assume that routers CE-2 and CE-3 are configured as DLAs and that server 152 is configured as an SLA. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SLA.

Figure 3A:
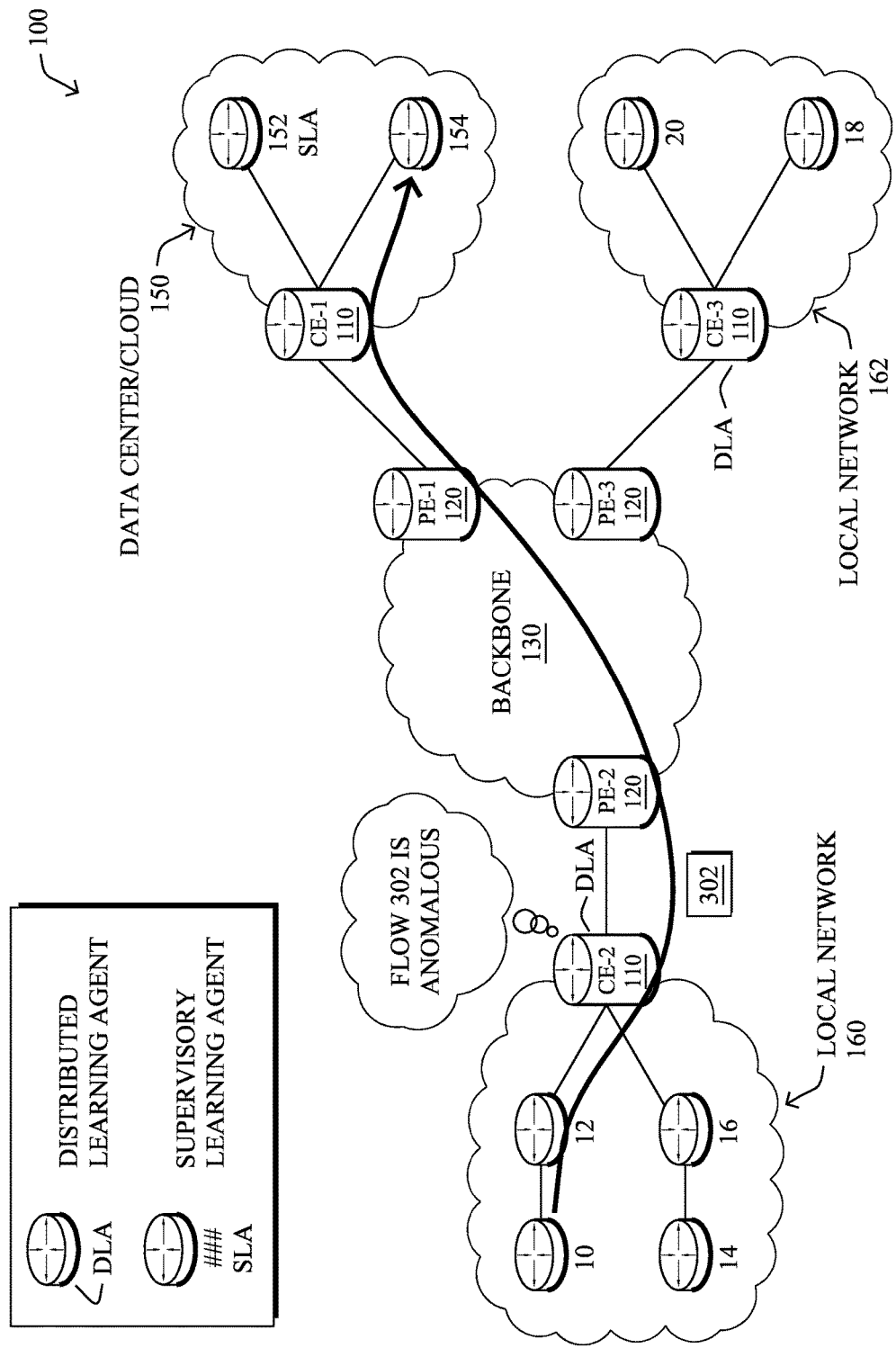
FIGS. 3A-3D illustrate an example an anomalous traffic flow being detected.

As shown in FIG. 3A, assume that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154. In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

Figure 3B:
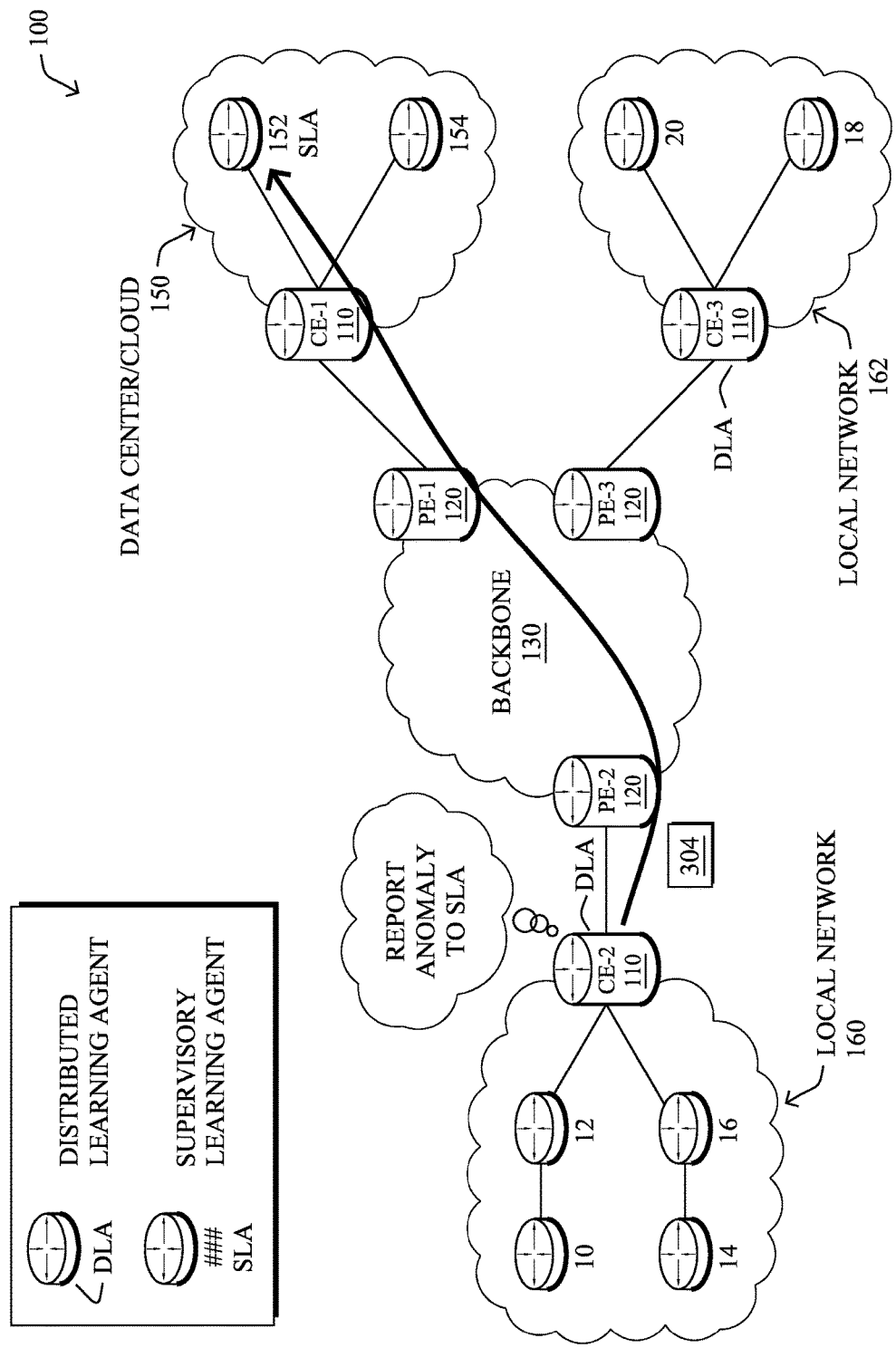

A DLA may report a detected anomaly to the SLA. For example, as shown in FIG. 3B, CE-2 may provide indication 304 to SLA/server 152, in response to identifying traffic flow 302 as anomalous. Indication 304 may include data regarding the characteristics of traffic flow 302 and/or any other information that may be used by SLA/server 152 to initiate further measures in network 100. For example, the indication provided by a DLA to the SLA regarding a detected anomalous traffic flow may indicate the source of the flow, the destination of the flow, the type of flow (e.g., SYN requests, etc.), the duration of the flow, data regarding the model used by the DLA to identify the flow as anomalous, or any other such information. As shown, for example, indication 304 may include the 5-tuple that uniquely identifies traffic flow 302, in addition to the direction of the flow (e.g., ingressing or egressing local network 160). Such a 5-tuple may include the network address and port number of the flow source, the network address and port number of the flow destination, and the protocol used by the traffic flow, thus uniquely identifying the traffic flow in the network.

Figure 3C:
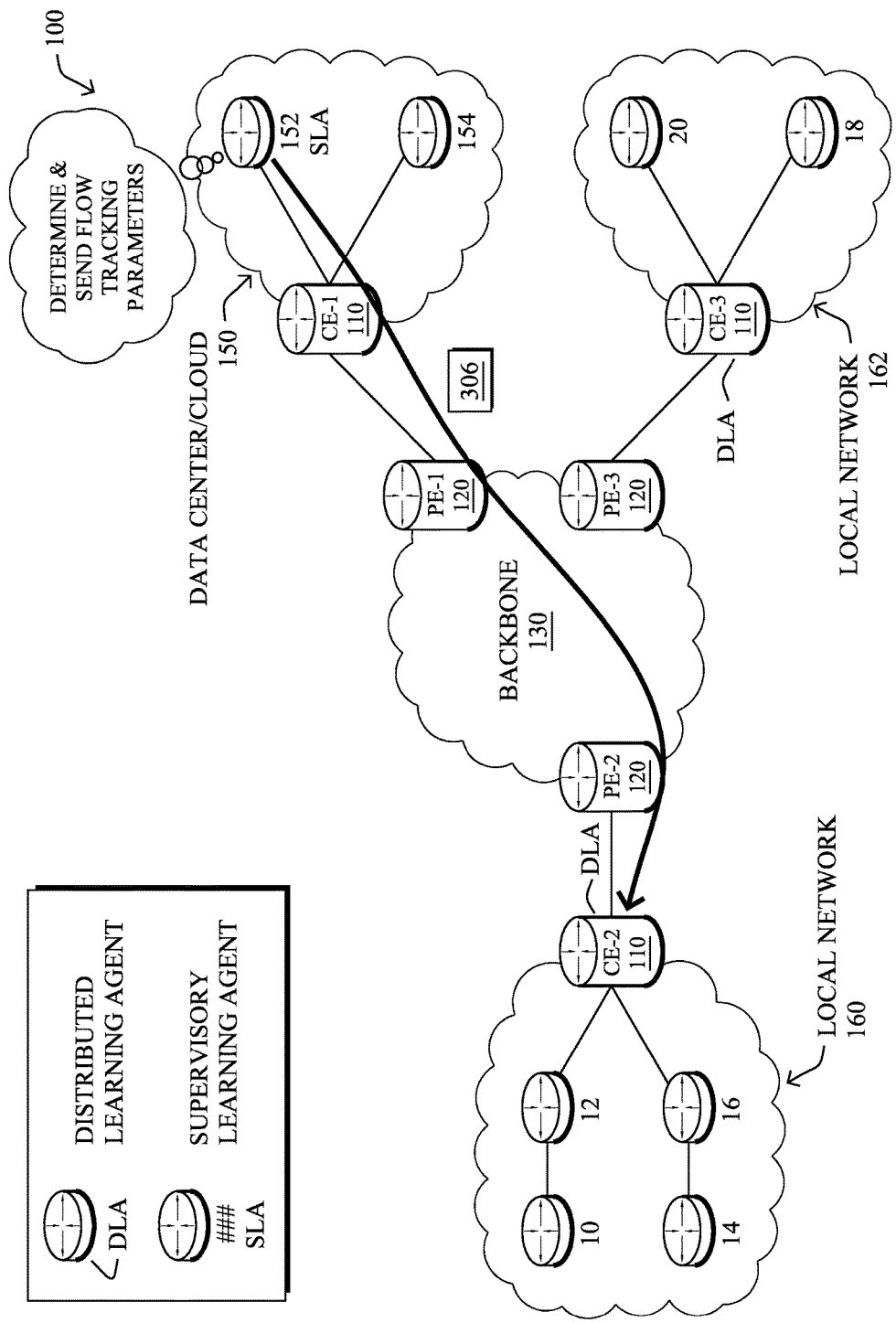

In some embodiments, the SLA may determine that additional analysis of an anomalous traffic flow is needed (e.g., in response to receiving an indication of the flow being deemed anomalous by a DLA, based on input from a user, etc.). In such cases, the SLA may generate flow tracking criteria based on the information it receives regarding the anomalous flow (e.g., the indicated 5-tuple and flow direction, etc.). For example, as shown in FIG. 3C, SLA/server 152 may provide flow tracking criteria 306 to DLA/router CE-2. Flow tracking criteria 306 may function as a matching rule (e.g., a class map, access control list, etc.) that may be used by the receiving DLA to identify further packets for additional analysis. For example, CE-2 may use flow tracking criteria 306 to identify in real time packets that match the criteria, so that certain action/mitigation or quarantine policies may be applied to the matching packets.

Figure 3D:
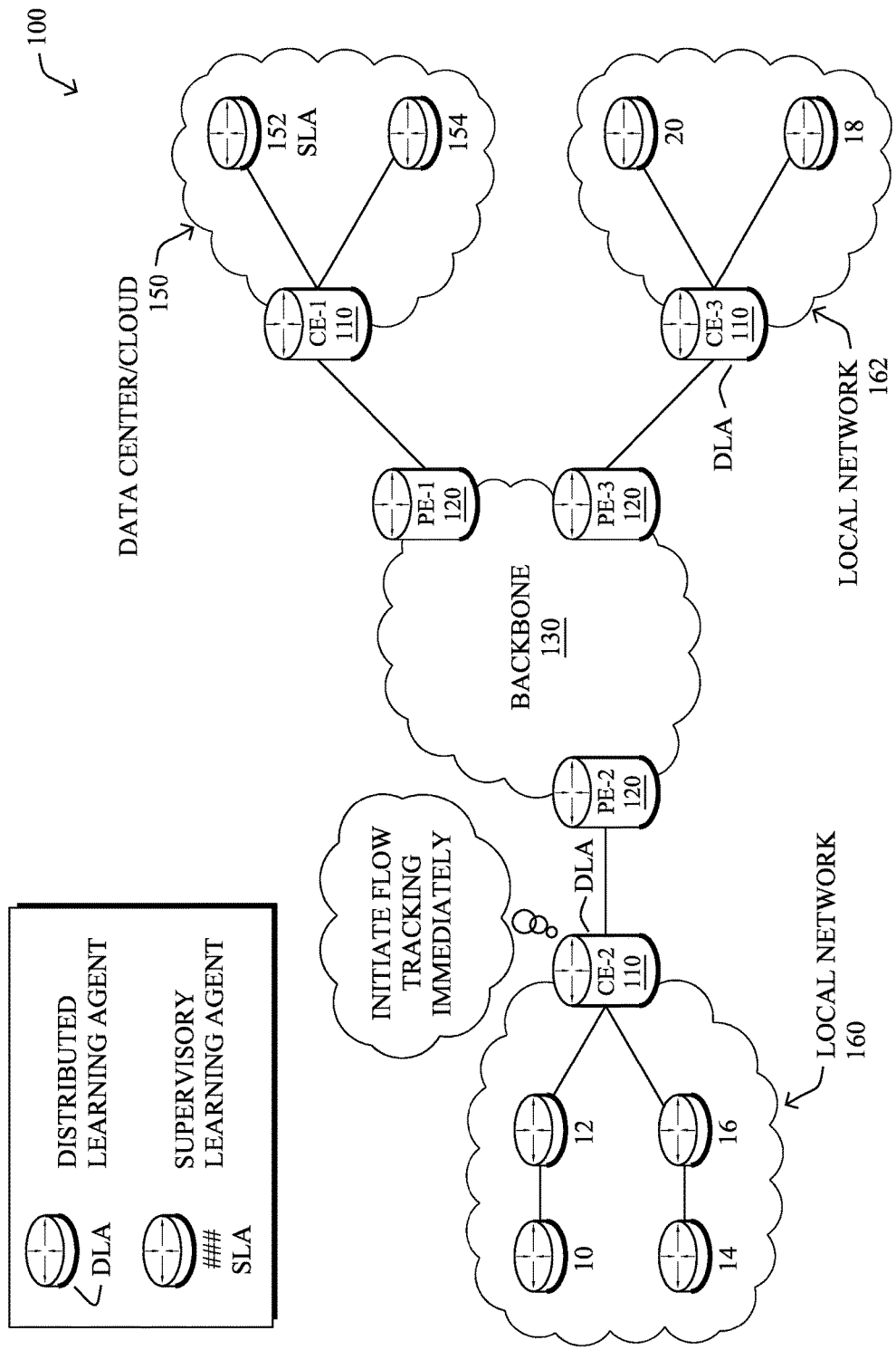

The SLA may determine the flow tracking criteria in real time by identifying the interfaces corresponding to the direction of the anomalous traffic flow and/or any effects of existing flow tracking criteria on the DLA that overlap the tracking criteria being generated dynamically by the SLA. In some embodiments, the flow tracking criteria may be triggered automatically when an anomaly has been detected by the DLA or in response to receiving confirmation that the flow requires further analysis (e.g., based on feedback from a user, based on rules maintained by the SLA, etc.). In other words, the DLA may proactively trigger packet tracking, in some cases. In this mode, the DLA will not wait for any information or instructions to be received from the SLA, but instead attempt to track/capture traffic it deems anomalous, in response to detecting an anomalous flow. For example, as shown in FIG. 3D, router CE-2 may initiate flow tracking immediately, in response to determining that traffic flow 302 is anomalous.

In other embodiments, as discussed previously with respect to FIG. 3C, a less proactive mechanism may be used whereby the SLA determines the tracking criteria/rules (e.g., the direction, flows, etc. to be tracked) and pushes these criteria down to the DLA, to allow the DLA to match traffic flow packets with specific actions (e.g., according to one or more policies pushed to the DLA with the tracking criteria). In yet another embodiment, the tracking criteria may be broader than the anomalous traffic itself. For example, instead of using a highly selective 5-tuple as a unique key, the tracking criteria may use a broader key to capture a larger subset of the traffic (e.g., packets outside of the anomalous traffic flow that may also be potentially of interest).

Figure 4A:
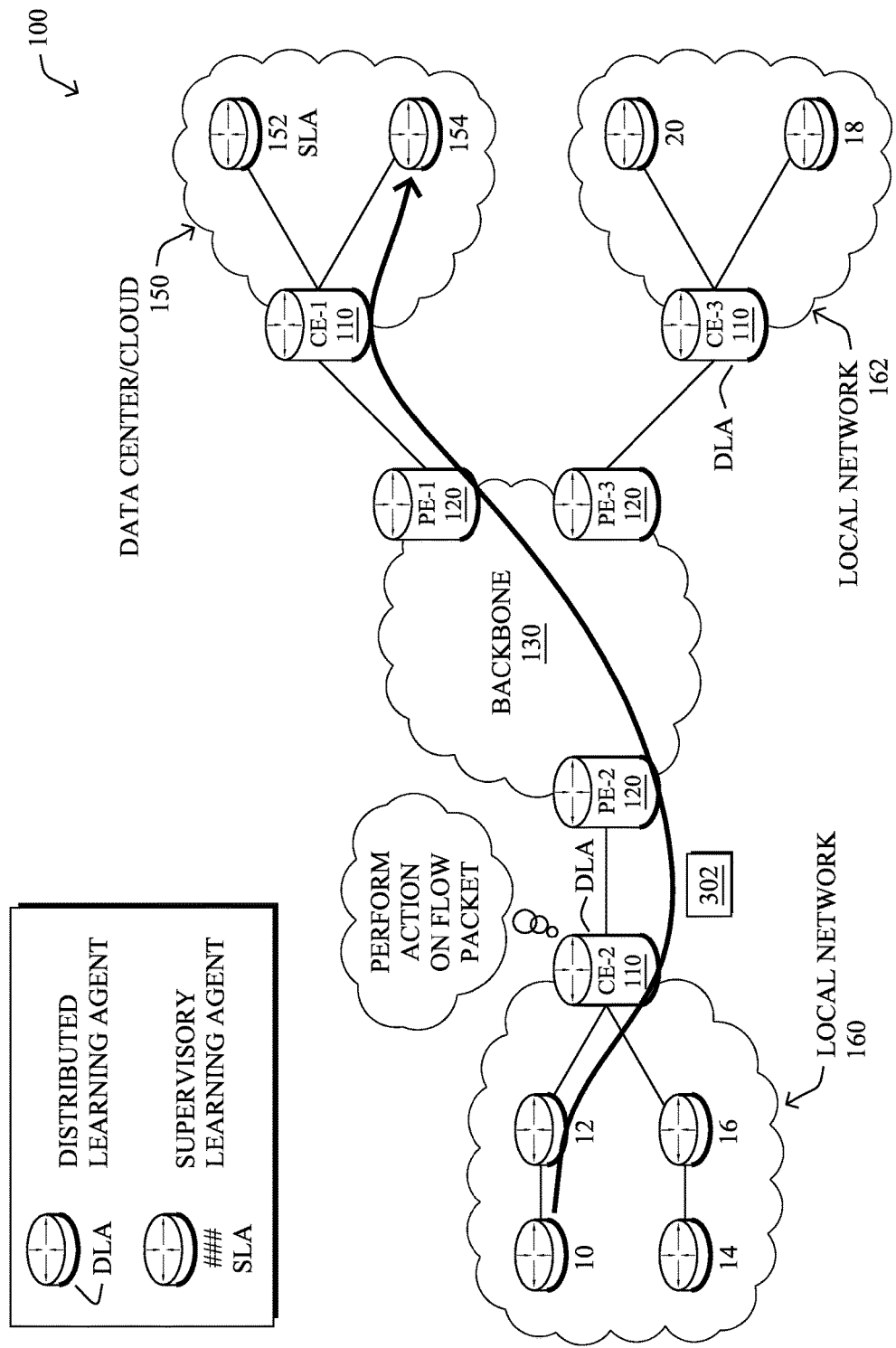
FIGS. 4A-4C illustrate examples of mitigation and quarantine actions being performed on packets of an anomalous traffic flow.

In various embodiments, a DLA may perform any number of dynamic network actions on the tracked packets of an anomalous traffic flow. For example, as shown in FIG. 4A, DLA/CE-2 may perform a network action on traffic flow 302, based on the packet tracking criteria. In other words, the DLA may perform a specific action on the tracked packets according to an action policy, either maintained locally (e.g., in the proactive case) or pushed to the DLA as part of the packet tracking criteria by the SLA (e.g., in the less proactive case). These actions may be default actions based on the severity and/or type of the detected anomaly or may be customizable by the security expert via a user interface provided by the SLA, in various implementations.

Figure 4B:
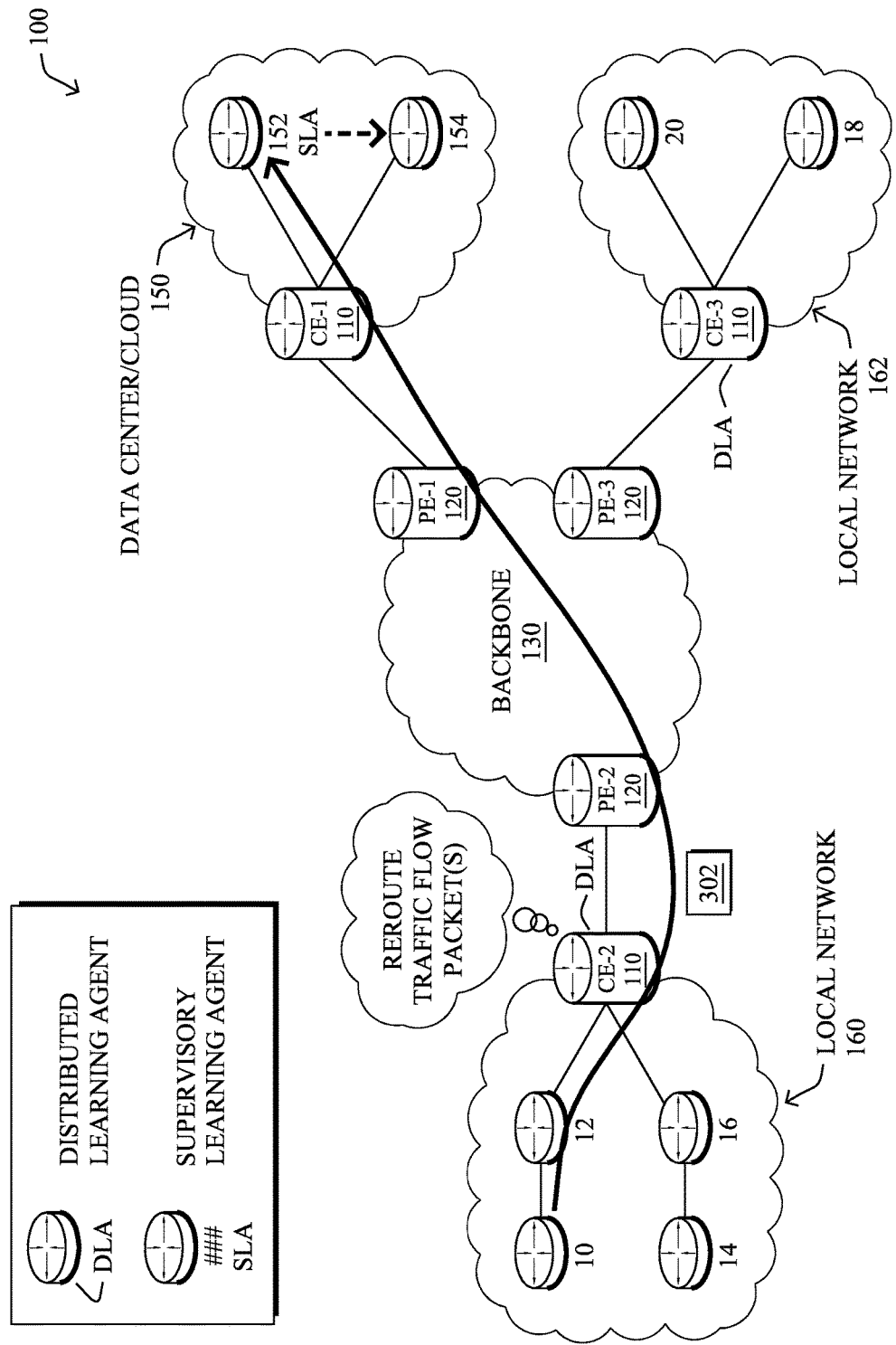
Figure 4C:
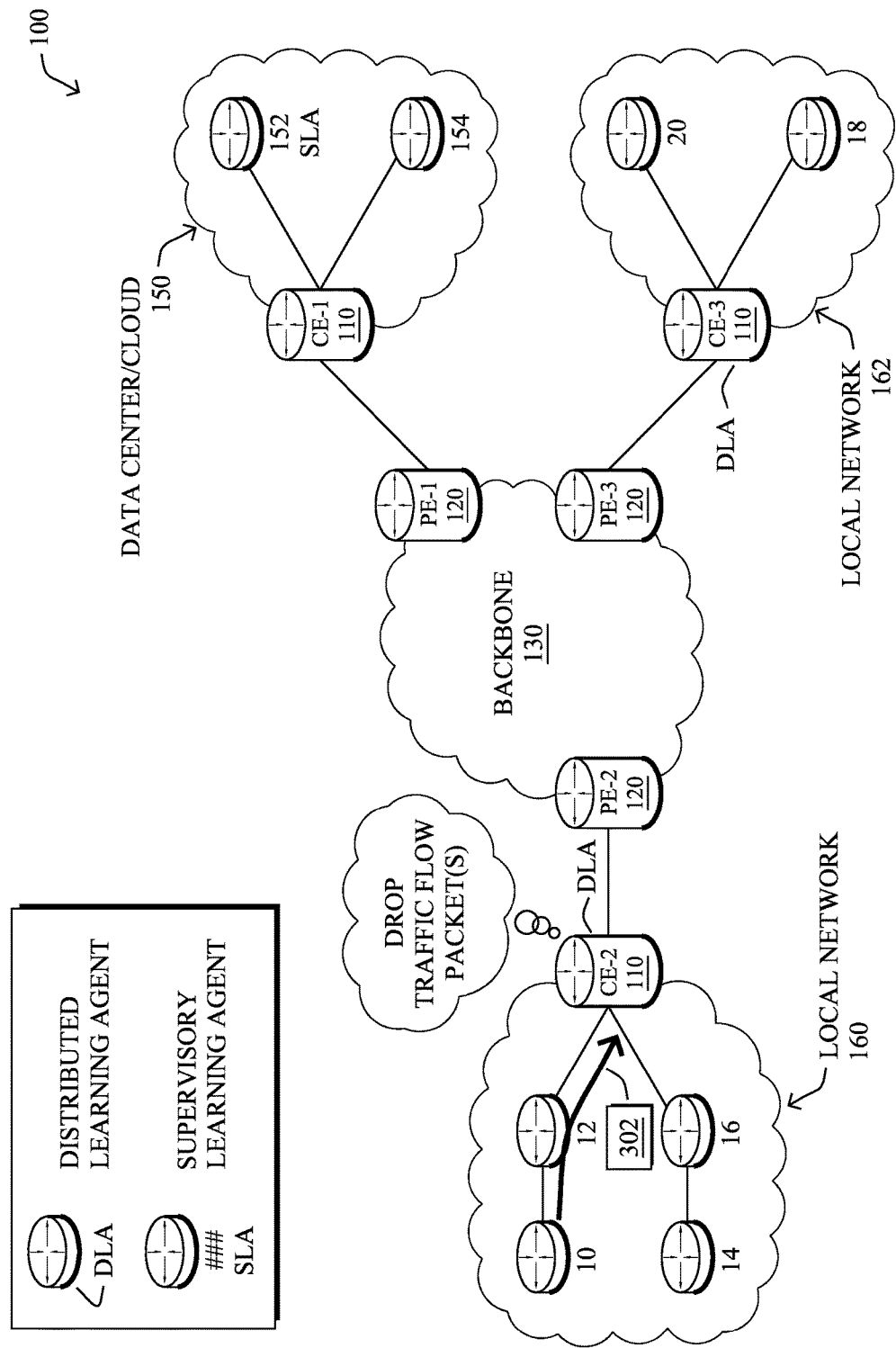

An action policy may generally cause the DLA to alter how the tracked packets of the anomalous traffic flow are processed. In one embodiment, an action may correspond to the rerouting of all packets that match the tracking criteria to another section of the network for detailed analysis. For example, as shown in FIG. 4B, DLA/CE-2 may reroute traffic flow 302 through SLA 152, which may or may not forward the traffic to the intended destination. In another embodiment, an action may correspond to the DLA rerouting the matching traffic to a user interface, if certain conditions in the network are met (e.g., a threshold amount of network congestion, a percentage of utilization of the upstream link, etc.). In further embodiments, the DLA may take more drastic actions, based on the perceived threat of the anomaly. For example, as shown in FIG. 4C, router CE-2 may drop the packets of traffic flow 302 that match the tracking criteria. In further embodiments, the action may correspond to the DLA adjusting a priority of the packets (e.g., by marking or remarking the packets with a DSCP value to apply a QoS policy to the packets, etc.), the DLA marking the traffic as anomalous (e.g., by setting a flow label flag that indicates that the traffic is suspicious). As noted previously, the DLA may begin performing the actions proactively, in some cases. For example, CE-2 may perform an action on the tracked packets of traffic flow 302 based on a history of monitored packets. For example, if traffic flows originating from a particular subnet have regularly been marked as anomalies of various threat levels or types, a sampled packet copy could be triggered such that a security expert can periodically keep analyzing the traffic from the potentially affected subnet.

Figure 5A:
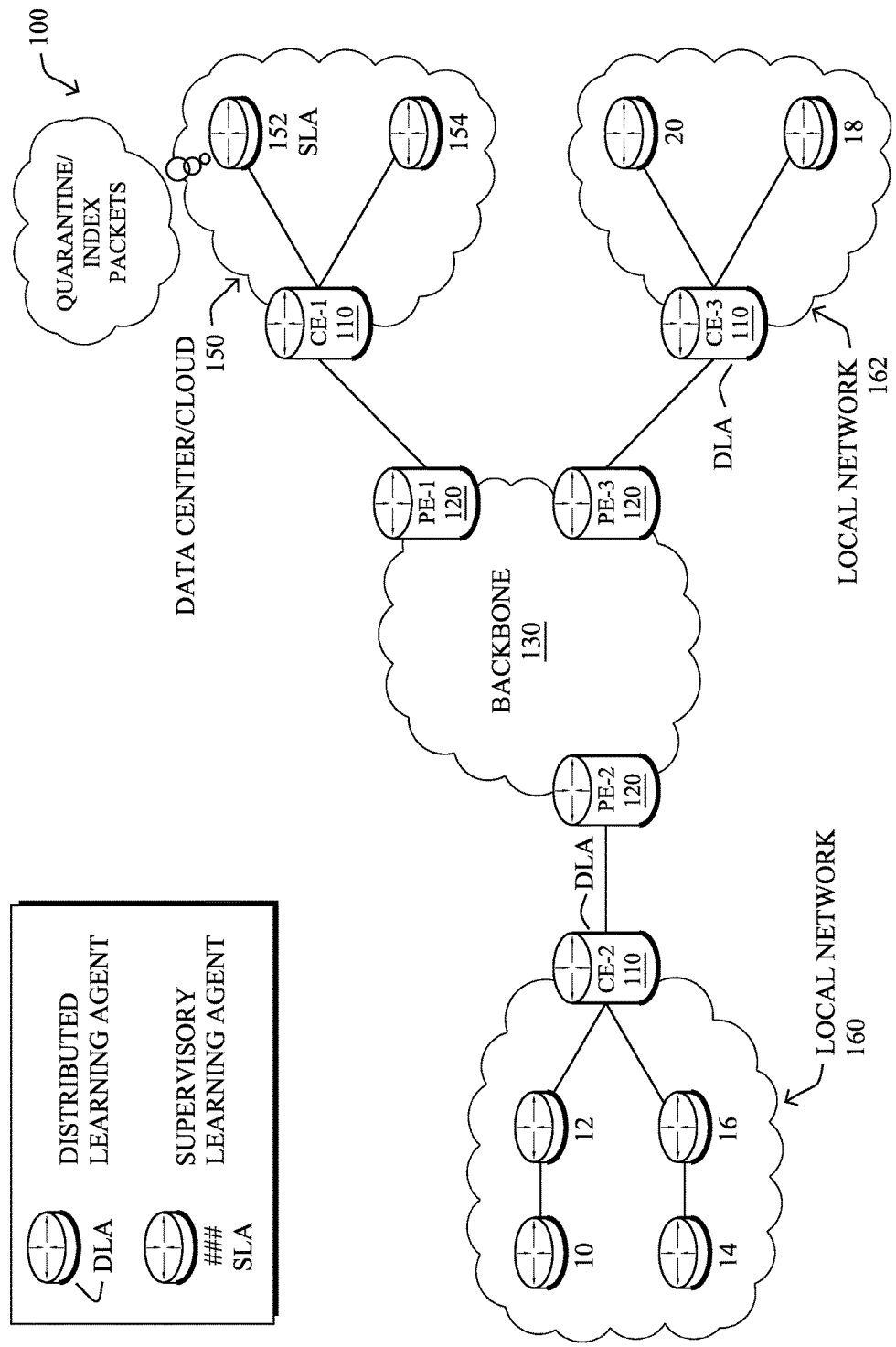
FIGS. 5A-5D illustrate examples of quarantined packets being analyzed.

The techniques herein also provide a quarantine mechanism for anomalous traffic flows, thereby allowing further inspection of the flows down to the packet level by an expert (e.g., by a human security specialist, by a supervisory device, etc.). In particular, an infrastructure is disclosed whereby packets from different traffic flows deemed anomalous may be received, indexed, and stored by a quarantine device. For example, as shown in FIG. 5A, SLA/server 152 may function as a quarantine device that quarantines and indexes packets of tracked flows. In other embodiments, the quarantine device may be a different device in the network than the SLA. The quarantined traffic flows may be flowing in various parts of the network, completely isolated from one another, with their only common factor being deemed anomalous by the distributed DLAs.

As part of the indexing process, the quarantine device may also store metadata associated with the packets (e.g., based on data from the DLA, SLA, etc.). Such metadata may include, but is not limited to, data indicative of the type of anomaly (e.g., a graph based anomaly, an end host based anomaly, etc.), the severity of the anomaly, the details of the flows, the length of the captured and stored packets, whether the DLA proactively initiated capturing and quarantining the packets, etc.

In various embodiments, a DLA may facilitate quarantining packets of an anomalous traffic flow according to a quarantine policy. In general, a quarantine policy controls how packets of an anomalous traffic flow are captured for further analysis. Similar to the action policy, the quarantine policy may be implemented proactively by the DLA (e.g., in response to identifying an anomalous traffic flow) or less proactively (e.g., the SLA may determine the policy based on the type or severity of the anomaly and provide the policy to the DLA with the tracking criteria).

Figure 5B:
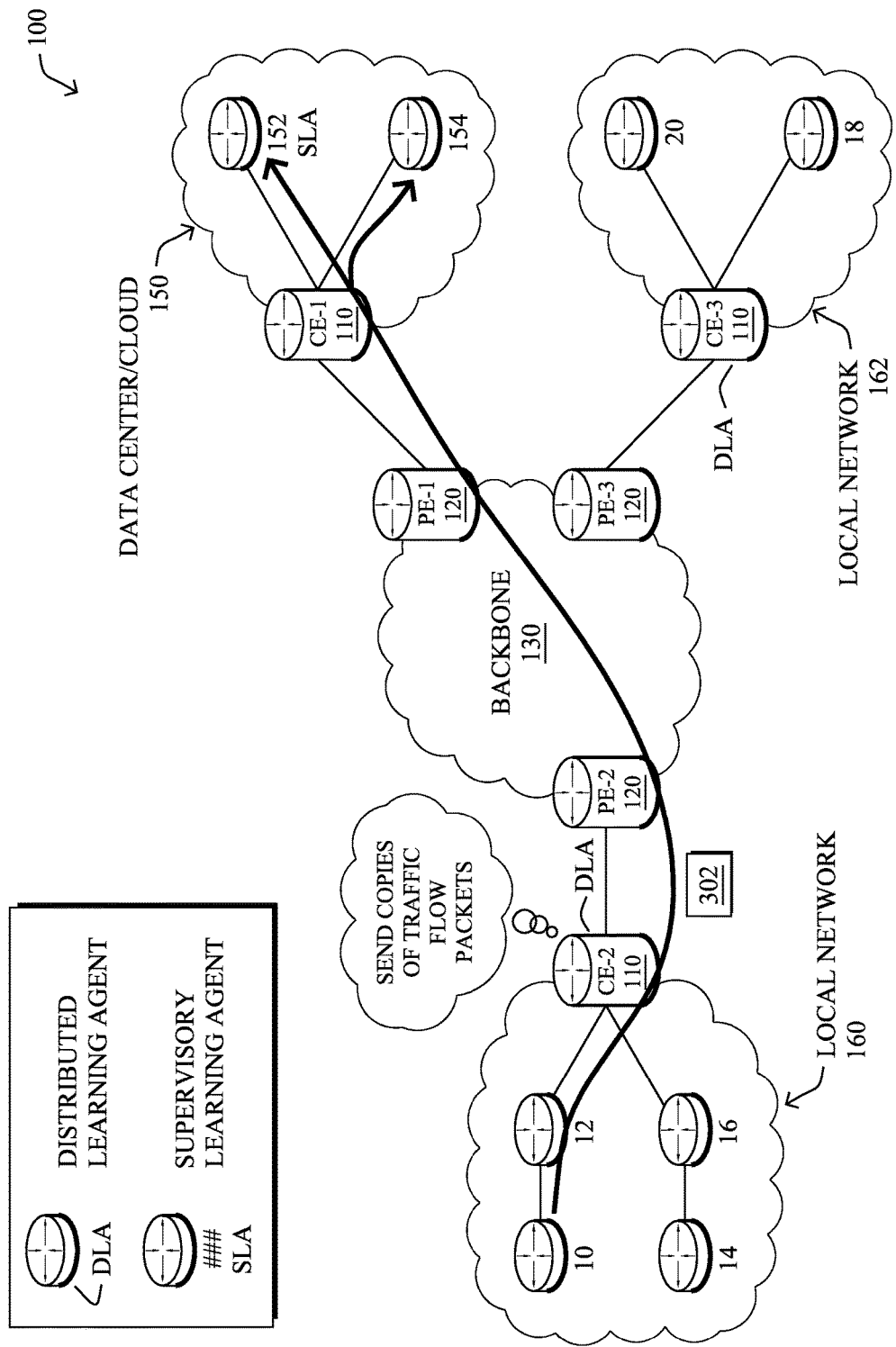

In one embodiment, a quarantine policy may cause the DLA or another network device to provide a copy of the tracked packets of an anomalous flow to a quarantine device. For example, as shown in FIG. 5B, a copy of the packets of traffic flow 302 may be provided to SLA/server 152, which acts as a quarantine device. In some cases, the quarantine policy may cause one or more device to enable a packet sniffing mechanism that generates the packet copies (e.g., using the Switched Port Analyzer (SPAN) mechanism of Cisco Systems, Inc., etc.). For example, an upstream or downstream switch along the path of the flow may be instructed to initiate the packet copying, if the DLA is unable to do so (e.g., due to port limitations, limited processing resources, etc.). The copied packets may include all packets that match the packet tracking criteria for the anomalous flow or only a subset thereof. For example, in some cases, the device that copies the packets may employ sampling, to capture only a subset of the packets.

Figure 5C:
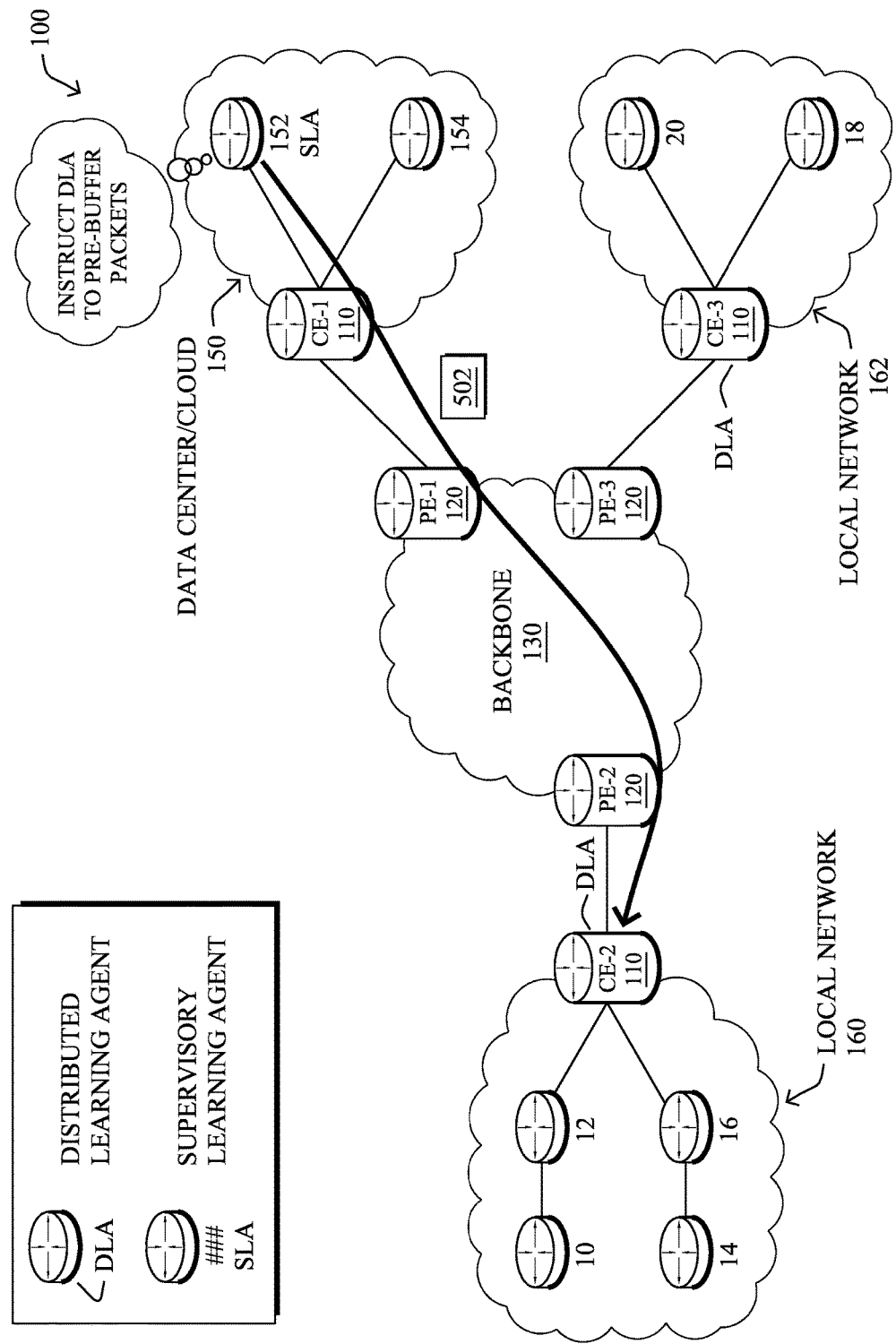

Another quarantine option that may be selected via a quarantine policy may cause the DLA or another network device to pre-buffer the tracked packets. For example, as shown in FIG. 5C, SLA/server 152 may instruct DLA/CE-2 to pre-buffer packets of anomalous traffic flow 302. In such a mechanism, packets of the tracked flow may be buffered by the DLA or other device and periodically exported to the quarantine device for further analysis. Doing so may allow the anomalous traffic flow to be stopped immediately until a more thorough analysis of the traffic is performed (e.g., by a human expert, by a supervisory device, etc.).

As noted previously, a DLA or other network device may reroute packets of an anomalous traffic flow. In some embodiments, the quarantine policy may be such that the packets are rerouted to the quarantine device, where the packets may be stored, copied, and/or forwarded to the destination. For example, referring again briefly to FIG. 4A, traffic flow 302 may be rerouted to SLA/server 152, which may also act as a quarantine device, according to the quarantine policy.

Thus, one of two modes may generally be used for purposes of quarantining/capturing packets: an inline mode or a reroute mode. In the inline mode, a copy of the packet is made and sent to the quarantine area. This may not affect the stream itself and the communication between the corresponding endpoints of the flow may be allowed to continue. However, as noted previously, another quarantine option may be to reroute the traffic flow to a quarantine device. This may or may not affect the original communication, in various embodiments. For example, in one embodiment, live analysis of the traffic could take place via the quarantine device while the flow is still live (e.g., allowing real time monitoring of the packets). In another embodiment, the communication channel may be killed and all remaining packets of the anomalous flow may be stored by the quarantine device (e.g., the quarantine device may not forward the packets on to the destination). In some cases, once traffic has been rerouted to the quarantine device, communication with the external world may be simulated so as to give the impression to the attacker that the attack was successful.

Figure 5D:
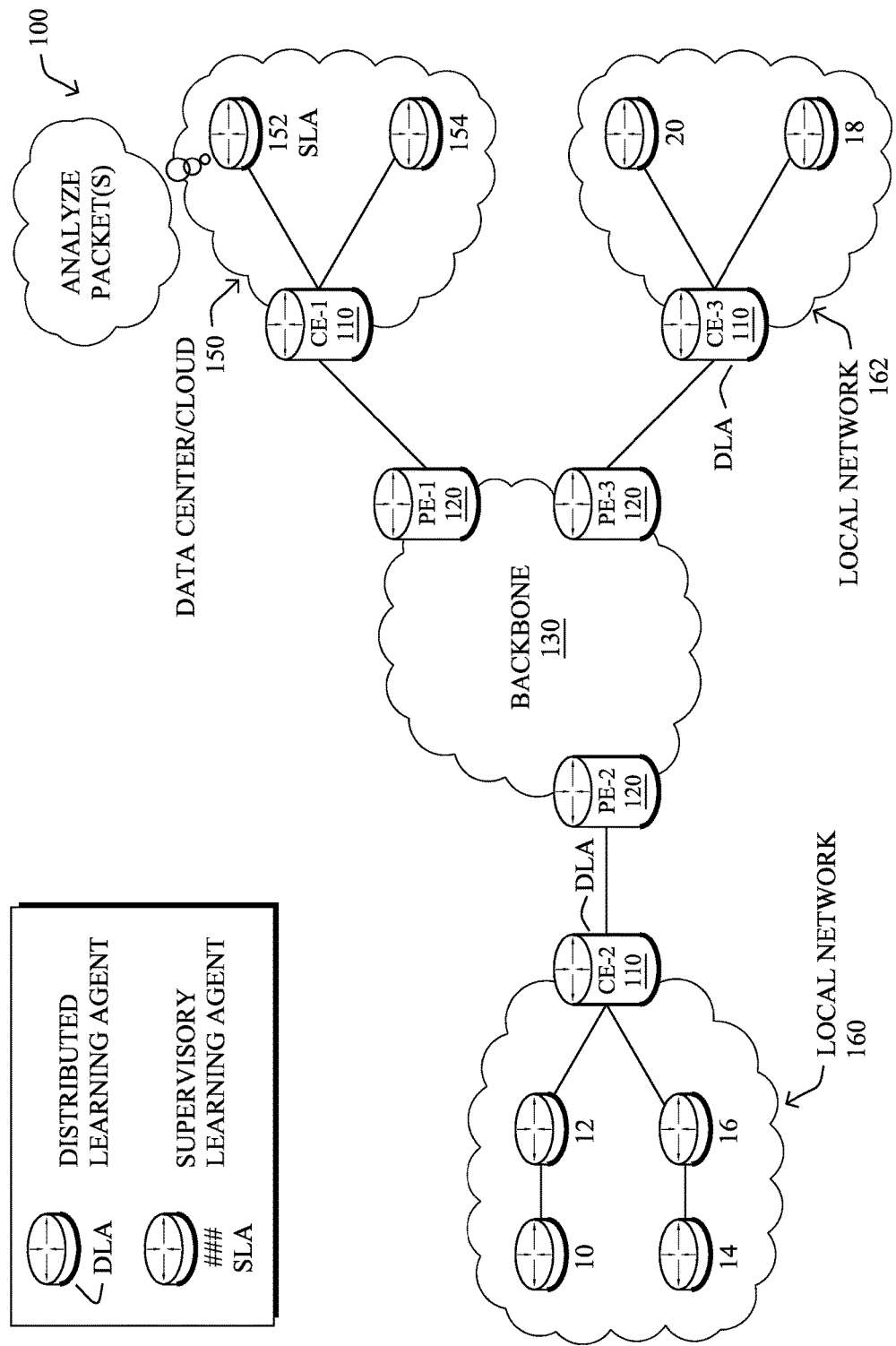

In another aspect of the techniques herein, captured/quarantined packets of an anomalous traffic flow may be analyzed in greater detail. For example, as shown in FIG. 5D, the indexed and stored packets of an anomalous flow may be analyzed by the SLA directly (e.g., to confirm that the packets are anomalous) and/or by providing information regarding the packets to a user interface.

As would be appreciated, any anomalous communication between two hosts will typically contain a lot of control data, as well as data channel information. In various embodiments, the quarantine device may be configured to provide varying levels of information to a user interface (e.g., a webpage provided to a display, a screen of a stand-alone application configured to interface with the quarantine device, etc.). For example, a user device may query the quarantine device for a raw representation of all packets in the anomalous traffic flow, only the packets containing payloads, or only the control packets of the traffic flow. This sort of hierarchic representation allows a human expert to focus on relevant parts of the flow for analysis. For example, the expert might be interested in seeing only the data. In another example, the expert may request only control packets, to see if the anomaly corresponds to a control plane attack such as a TCP-based flooding attack (e.g., a SYN attack, etc.), an HTTP recursive-GET attack, or the like.

Various custom messages may also be passed between the different infrastructure devices. In one embodiment, an SLN_ANOMALY( ) message may be sent to the SLA (e.g., by the quarantine device, by the DLA, etc.) that notifies the SLA that an anomaly has taken place and that the SLA has the ability to query for more details. In another embodiment, a custom SLN_DVM_TRAFFIC_TYPE( ) message may be sent to the SLA, to represent the type of packet information available to the SLA (e.g., all packets, control packets, topology, a mixture, etc.). In yet another embodiment, a custom SLN_SCA_QUERY( ) message may be sent by the SLA to the quarantine device that requests specific information from the quarantine device (e.g., the types of packets to return, other search criteria such as anomaly severity, time of day, etc.).

Figure 6:
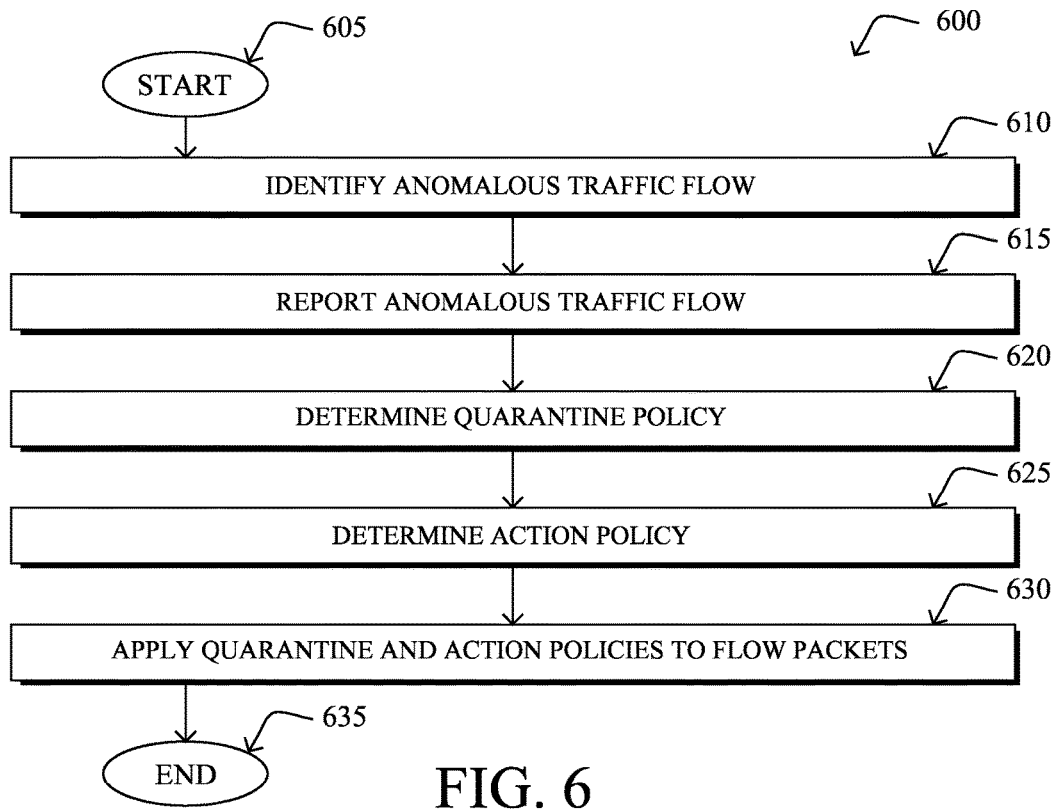
FIG. 6 illustrates an example simplified procedure for applying action and quarantine policies to packets of a traffic flow.

FIG. 6 illustrates an example simplified procedure for applying action and quarantine policies to packets of a traffic flow, in accordance with one or more embodiments described herein. The procedure 600 may start at step 605 and continues on to step 610 where, as described in greater detail above, a device in a network identifies an anomalous traffic flow. In various embodiments, the device may be a DLA that monitors and analyzes traffic using one or more machine learning models (e.g., a classifier model, a reconstruction model, etc.) and/or one or more analytics models (e.g., a mathematical model that does not use machine learning). Such models may take into consideration the address or port of the source device, the address or port of the destination device, the direction of the traffic flow, the frequency of the traffic flow, device characteristics (e.g., queue states, etc.), or any other information that may be used as input to an anomaly detection model.

At step 615, the device reports the anomalous traffic flow to a supervisory device, as detailed above. For example, a DLA that detects an anomalous traffic flow may provide information regarding the flow to an SLA. Such a report may include one or more identifies for the flow (e.g., a 5-tuple that uniquely identifies the flow), the type and/or severity of the detected anomaly, or any other information associated with the detected anomalous traffic flow.

At step 620, the device determines a quarantine policy for packets of the anomalous traffic flow, as described in greater detail above. In general, the quarantine policy corresponds to the methodology through which packets of the anomalous flow may be captured for further analysis. Such a capturing may be a true quarantine whereby the packets are prevented from reaching the destination (e.g., either temporarily or permanently) or a pseudo-quarantine whereby copies of the packets are captured for purposes of analysis but are still delivered to the destination. In other words, a corresponding quarantine device may be used to impose a true quarantine on the packets or may impose a pseudo-quarantine via which analysis may be performed on captured packets, but the packets are still allowed to be delivered (e.g., the quarantine device may be a quarantine or analysis device). In various embodiments, the quarantine policy may cause the device to reroute all packets of the traffic flow to a quarantine device, to provide copies of the traffic flow to the quarantine device (e.g., all packets, sampled packets, etc.), or to (pre)buffer packets of the packets at the device and provide the buffered packets to the quarantine device. In further embodiments, the device may determine the quarantine policy proactively and in response to identifying the flow as anomalous (e.g., without first receiving an instruction to do so from a supervisory device) or may determine the policy by receiving the policy from the supervisory device.

At step 625, the device determines an action policy, as described in greater detail above. In general, the action policy controls how and if the packets of the anomalous flow are handled within the network. In some cases, the action policy may cause the device to perform some form of mitigation on the anomalous traffic flow. For example, the action policy may cause the device to drop the packets or otherwise not forward the packets, to mark or flag the packets as anomalous (e.g., using a flow label, etc.), to reroute the packets (e.g., to the quarantine device, via a specified path, etc.), to lower the priority of the packets (e.g., by adjusting a DSCP value or QoS policy, etc.), or the like. In other cases, the action policy may still allow the traffic flow to be delivered to the destination. Similar to the quarantine policy, the device may determine the action policy proactively and in response to detecting the anomalous flow or determine the policy by receiving the policy from the supervisory device, in response to reporting the anomaly.

At step 630, the device applies the quarantine and action policies to one or more packets of the anomalous flow, as detailed above. Notably, the device may cause the one or more packets to be captured/quarantined for further analysis by an expert (e.g., an expert device, a human expert, etc.), according to the quarantine policy. In addition, the device may apply the action policy to the packets, thereby controlling how the traffic flow affects the network. In some embodiments, the device may also apply the quarantine and action policies to one or more packets outside of the traffic flow. For example, the device may be instructed by the supervisory device to track and apply the policies to a broader range of packets than those specific to the anomalous traffic flow. Procedure 600 then ends at step 635.

Figure 7:
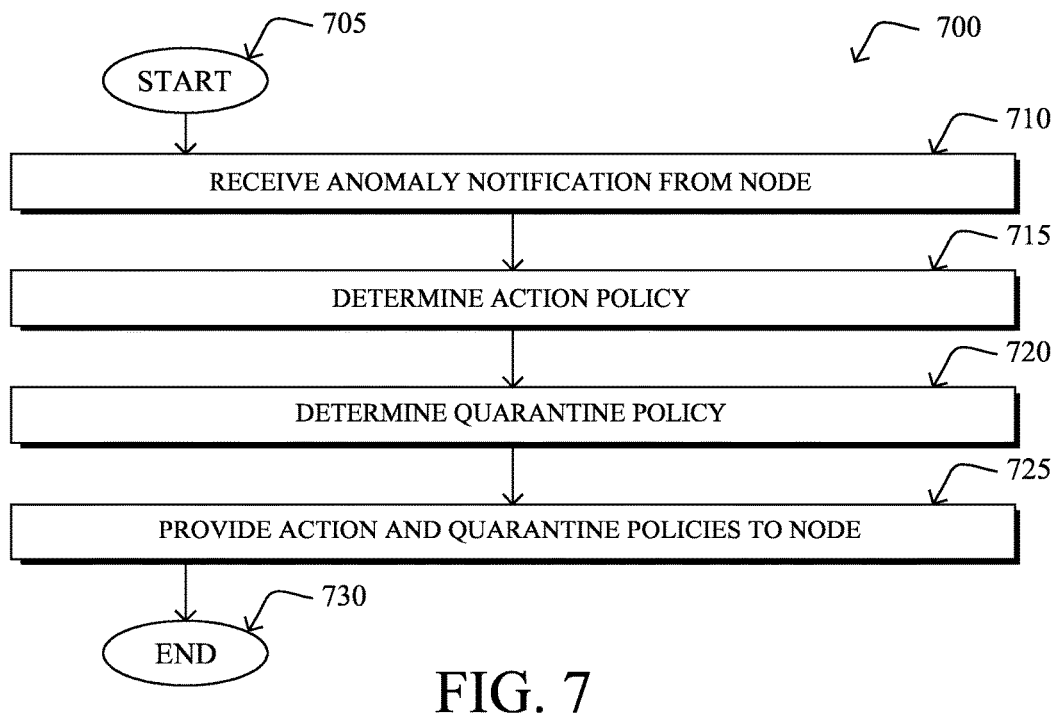
FIG. 7 illustrates an example simplified procedure for providing action and quarantine policies to a network node.

FIG. 7 illustrates an example simplified procedure for providing action and quarantine policies to a network node, in accordance with the embodiments herein. Procedure 700 may begin at step 705 and continue on to step 710 where, as described in greater detail above, a device in a network receives an anomaly notification from a node in the network. For example, an SLA may receive a notification from a DLA in the network that the DLA has identified an anomalous traffic flow. Such a notification may include the unique identifiers of the flow (e.g., the addresses, ports, and direction of the flow) and/or any of the flow characteristics (e.g., flow duration, anomaly type, etc.).

At step 715, as detailed above, the device determines an action policy based on the type and/or severity of the anomaly. In general, the action policy may control how further packets of the anomalous traffic flow are handled by one or more nodes in the network. In some cases, the action policy may dictate that a mitigation action be performed. For example, the action policy may cause the node to drop the packets entirely, adjust the priority of the packets (e.g., lowering the priority of potentially malicious traffic), cause the traffic flow to take a different network path, or apply traffic shaping to the anomalous traffic. In other cases, the action policy may simply cause the node to flag one or more packets in the anomalous flow as anomalous.

At step 720, as detailed above, the device may also determine a quarantine policy based on the severity and/or type of the anomaly. Such a policy may control how one or more nodes in the network operate to quarantine/capture packets of the anomalous traffic flow. For example, the quarantine policy may cause a node to enable a packet sniffing mechanism to send copies of one or more packets to a quarantine device. In other examples, the quarantine policy may cause the node to provide only a sampled subset of the packets in the flow to the quarantine device or cause the node to buffer the packets of the flow and provide the buffered packets to the quarantine device. In yet other embodiments, the quarantine policy may cause the node to redirect the anomalous traffic flow to the quarantine device.

In some embodiments, the action policy and/or the quarantine policy determined in steps 715-720 may be based in whole or in part on feedback from a user interface. For example, in some embodiments, the device may provide information regarding the detected anomaly to a webpage, stand-alone application, or the like, for review by a human user. Such information may include, in various embodiments, a raw representation of all stored packets of the anomalous traffic flow, a subset of the stored packets that contain payloads, or a subset of the stored packets that are control packets. In response to providing the information to the user interface, the device may receive the action and/or quarantine policies, as specified by a human expert.

At step 725, the device provides the action and quarantine policies to the node, as described in greater detail above. Notably, the action and quarantine policies may operate in conjunction to dynamically control how the node quarantines/captures packets of the anomalous flow (e.g., for further review by a security expert), as well as potentially preventing any negative impact the anomaly has on the network. Procedure 700 then ends at step 735.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide a mechanism that allows the dynamic capture of packets of an anomalous traffic flow, allowing a more detailed analysis of the flow at the packet level (e.g., by a security operations team, etc.). The techniques herein also provide for the quarantine of such traffic temporarily or permanently, to prevent the spread of anomalies or exfiltration of information. The techniques herein further provide for dynamic attribute mapping of the anomalous traffic, to allow any network action to be applied to the traffic flow (e.g., packet marking, rerouting, dropping the traffic, etc.). An infrastructure is also disclosed herein that allows packets of anomalous flows from various locations in the network to be stored and indexed using metadata, to allow review of the packets (e.g., by a security expert, etc.). The quarantine/capturing techniques herein further allow for the separation of different packet types (e.g., data vs. control packets, etc.), allowing for easier and more focused analysis by a human or machine expert.

While there have been shown and described illustrative embodiments that provide for the capture of packets of an anomalous traffic flow in a communication network, it is to be understood that various other adaptations and modifications may be made within the spirit and scope of the embodiments herein. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a first device in a network, an anomalous traffic flow in the network using a machine-learning model;
   reporting, by the first device, the anomalous traffic flow to a supervisory device in the network;
   dynamically determining, by the first device, a quarantine policy for the anomalous traffic flow, wherein the quarantine policy corresponds to a methodology through which packets of the anomalous flow are captured for further analysis;
   dynamically determining, by the first device, an action policy for the anomalous traffic flow, wherein the action policy corresponds to how and if the packets of the anomalous flow are handled within the network and is determined based on at least a severity of the anomaly associated with the anomalous flow, wherein the first device receives the action policy from the supervisory device, in response to reporting the anomalous traffic flow to the supervisory device;
   proactively applying, by the first device, the quarantine and action policies to one or more packets of the anomalous traffic flow ,in response to identifying the anomalous traffic flow; and
   based on the quarantine policy and the action policy, sending packets to an attack detector.

2. The method as in claim 1, wherein determining the quarantine policy for the anomalous traffic flow comprises:
   receiving, at the first device, the quarantine policy from the supervisory device, in response to reporting the anomalous traffic flow to the supervisory device.

3. The method as in claim 1, wherein applying the quarantine policy to the one or more packets of the anomalous traffic flow comprises:
   providing, by the first device, a copy of the one or more packets of the anomalous traffic flow to a device for further analysis.

4. The method as in claim 1, wherein applying the quarantine policy to the one or more packets of the anomalous traffic flow comprises:
   sampling, by the first device, the one or more packets of the anomalous traffic flow; and
   providing, by the first device, the one or more sampled packets to a quarantine device.

5. The method as in claim 1, wherein applying the quarantine policy to the one or more packets of the anomalous traffic flow comprises:
   rerouting, by the first device, the one or more packets of the anomalous traffic flow to a quarantine device.

6. The method as in claim 1, wherein applying the quarantine policy to the one or more packets of the anomalous traffic flow comprises:
   buffering, at the first device, the one or more packets of the anomalous traffic flow; and
   providing, by the first device, the buffered one or more packets of the anomalous traffic flow to a quarantine device.

7. The method as in claim 1, wherein applying the action policy to the one or more packets of the anomalous traffic flow comprises at least one of: flagging the one or more packets as anomalous, dropping the one or more packets, lowering a priority associated with the one or more packets, or applying traffic shaping to the one or more packets.

8. The method as in claim 1, further comprising:
   receiving, at the first device, packet tracking criteria from the supervisory device; and
   applying, by the first device, the quarantine and action policies to the one or more packets of the anomalous traffic flow and to at least one packet outside of the anomalous traffic flow, based on the packet tracking criteria.

9. A method comprising:
   receiving, at a device in a network, an indication of an anomalous traffic flow detected by a node in the network using a machine-learning model;

storing, by the device, packets of the anomalous traffic flow with metadata indicative of at least one of: the anomaly type, severity, a packet capture duration, or an indication as to whether the packets were captured proactively by the node;

dynamically determining, by the device, an action policy for the anomalous traffic flow, based on an anomaly type or severity associated with the anomalous traffic flow;

dynamically determining, by the device, a quarantine policy for the anomalous traffic flow, based on the anomaly type or severity associated with the anomalous traffic flow, wherein the quarantine policy corresponds to a methodology through which packets of the anomalous flow are captured for further analysis;

providing, by the device, the action and quarantine policies to the node, wherein the provided quarantine policy and action policy cause the node to proactively apply the quarantine and action policies to one or more packets of the anomalous traffic flow, in response to receiving the indication of anomalous traffic flow; and based on quarantine policy and action policy, sending packets to an attack detector.

10. The method as in claim 9, wherein the provided action policy causes the node to at least one of: flag one or more packets of the anomalous traffic flow as anomalous, drop the one or more packets of the anomalous traffic flow, or lower a priority associated with the one or more packets of the anomalous traffic flow.

11. The method as in claim 9, wherein the provided quarantine policy causes the node to at least one of: provide sampled copies of packets of the anomalous traffic flow to the device, provide copies of all packets of the anomalous traffic flow to the device, reroute packets of the anomalous traffic flow to the device.

12. The method as in claim 9, further comprising:
providing, by the device, the indication of the anomalous traffic flow to a user interface; and
receiving, at the device, the action and quarantine policies from the user interface, in response to providing the indication of the anomalous traffic flow to the user interface.

13. The method as in claim 9, further comprising:
receiving, at the device, a query request for the packets of the anomalous traffic flow from a user interface; and
providing, by the device, data regarding the packets to the user interface based on the query request.

14. The method as in claim 13, wherein the query request requests one of: a raw representation of all stored packets of the anomalous traffic flow, a subset of the stored packets that contain payloads, or a subset of the stored packets that are control packets.

15. The method as in claim 13, wherein the data regarding the packets includes data regarding at least one packet of the anomalous traffic flow captured in real time.

16. An apparatus, comprising:
one or more network interfaces to communicate with a network;
a processor coupled to the one or more network interfaces and configured to execute a process; and
a memory configured to store the process executable by the processor, the process when executed operable to:
identify an anomalous traffic flow in the network using a machine-learning model;
report the anomalous traffic flow to a supervisory device in the network;
dynamically determine a quarantine policy for the anomalous traffic flow, wherein the quarantine policy corresponds to a methodology through which packets of the anomalous flow are captured for further analysis;
dynamically determine an action policy for the anomalous traffic flow, wherein the action policy corresponds to how and if the packets of the anomalous flow are handled within the network and is determined based on at least a severity of the anomaly associated with the anomalous flow, wherein the first device receives the action policy from the supervisory device, in response to reporting the anomalous traffic flow to the supervisory device;
proactively apply the quarantine and action policies to one or more packets of the anomalous traffic flow, in response to identifying the anomalous traffic flow; and
based on quarantine policy and action policy, sending packets to an attack detector.

17. The apparatus as in claim 16, wherein the apparatus applies the quarantine policy to the one or more packets of the anomalous traffic flow by at least one of: rerouting the one or more packets to a quarantine device in the network, providing a copy of the one or more packets to a device for further analysis, or providing a buffered set of packets of the anomalous traffic flow to the quarantine device.

18. An apparatus, comprising:
one or more network interfaces to communicate with a network;
a processor coupled to the one or more network interfaces and configured to execute a process; and
a memory configured to store the process executable by the processor, the process when executed operable to:
receive an indication of an anomalous traffic flow detected by a node in the network using a machine-learning model;
store packets of the anomalous traffic flow with metadata indicative of at least one of: the anomaly type, severity, a packet capture duration, or an indication as to whether the packets were captured proactively by the node;
dynamically determine an action policy for the anomalous traffic flow, based on an anomaly type or severity associated with the anomalous traffic flow;
dynamically determine a quarantine policy for the anomalous traffic flow, based on the anomaly type or severity associated with the anomalous traffic flow, wherein the quarantine policy corresponds to a methodology through which packets of the anomalous flow are captured for further analysis;
provide the action and quarantine policies to the node, wherein the provided action policy and quarantine policy cause the node to proactively apply the action and quarantine policies to one or more packets of the anomalous traffic flow, in response to receiving the indication of anomalous traffic flow; and
based on quarantine policy and action policy, sending packets to an attack detector.

19. The apparatus as in claim 18, wherein the provided action policy causes the node to at least one of: flag one or more packets of the anomalous traffic flow as anomalous, drop the one or more packets of the anomalous traffic flow, lower a priority associated with the one or more packets of the anomalous traffic flow, or apply traffic shaping to the anomalous traffic flow, and wherein the provided quarantine policy causes the node to at least one of: provide sampled copies of packets of the anomalous traffic flow to the device, provide copies of all packets of the anomalous traffic flow to the device, reroute packets of the anomalous traffic flow to the device.

20. The apparatus as in claim 18, wherein the process when executed is further operable to:
   receive a query request for the packets of the anomalous traffic flow from a user interface; and
   provide data regarding the packets to the user interface based on the query request, wherein the query request requests one of: a raw representation of all stored packets of the anomalous traffic flow, a subset of the stored packets that contain payloads, or a subset of the stored packets that are control packets.

* * * * *